(12) United States Patent
Agrawal et al.

(10) Patent No.: US 11,979,431 B1
(45) Date of Patent: May 7, 2024

(54) SYSTEM AND METHOD FOR PREVENTION OF LATERAL PROPAGATION OF RANSOMWARE USING ARP CONTROL ON NETWORK SWITCHES TO CREATE POINT-TO-POINT LINKS BETWEEN ENDPOINTS

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: Airgap Networks Inc., Santa Clara, CA (US)

( * ) Notice: Subject to any disclaimer, the term of this patent is extended or adjusted under 35 U.S.C. 154(b) by 0 days.

(21) Appl. No.: 18/357,338

(22) Filed: Jul. 24, 2023

(51) Int. Cl.
*H04L 29/06* (2006.01)
*H04L 9/40* (2022.01)

(52) U.S. Cl.
CPC ...... *H04L 63/1466* (2013.01); *H04L 63/0281* (2013.01)

(58) Field of Classification Search
CPC ............. H04L 63/1466; H04L 63/0281; H04L 63/1408; G06F 21/50
See application file for complete search history.

(56) References Cited

U.S. PATENT DOCUMENTS

| | | | |
|---|---|---|---|
| 6,914,905 B1 * | 7/2005 | Yip | H04L 45/00 370/395.53 |
| 2017/0223047 A1 * | 8/2017 | Pogulievsky | H04L 63/1408 |
| 2019/0124097 A1 * | 4/2019 | Thomas | G06F 21/43 |
| 2019/0312836 A1 * | 10/2019 | Phillips | H04L 9/00 |
| 2021/0226964 A1 * | 7/2021 | Wang | H04L 63/1416 |
| 2022/0166783 A1 * | 5/2022 | Yavo | H04L 63/1425 |
| 2023/0254334 A1 * | 8/2023 | Childress | H04L 63/1416 726/22 |

OTHER PUBLICATIONS

Arifeen, Murshedul, Andrei Petrovski, and Sergei Petrovski. "Automated microsegmentation for lateral movement prevention in industrial internet of things (iiot)." 2021 14th International Conference on Security of Information and Networks (SIN). vol. 1. IEEE, 2021. (Year: 2021).*

* cited by examiner

*Primary Examiner* — Ka Shan Choy
(74) *Attorney, Agent, or Firm* — PATENT LAW WORKS LLP

(57) ABSTRACT

A technique to improve security for a VLAN is disclosed. A security appliance is set as the gateway for intra-LAN communication. Message traffic is analyzed and anomalies are detected relative to normal message traffic that correspond to device health problems that may require service by a field technician. A network switch may be configured to drop certain types of Address Resolution Protocol messages from selected ports to aid in setting a security appliance as the gateway.

22 Claims, 8 Drawing Sheets

```
Switch# show mac address-table

Mac Address Table
-------------------------------------------
Vlan     Mac Address       Type       Ports
----     -----------       ----       -----
   1     0011.2233.4455    DYNAMIC    Fa0/1
   1     00aa.bbcc.ddee    DYNAMIC    Fa0/2
   1     00ff.eeaa.ddcc    DYNAMIC    Fa0/3
   1     00dd.ccbb.aaee    DYNAMIC    Fa0/4
   1     00bb.eeff.ccaa    DYNAMIC    Fa0/5
```

SYSTEM AND METHOD FOR PREVENTION OF LATERAL PROPAGATION OF RANSOMWARE USING ARP CONTROL ON NETWORK SWITCHES TO CREATE POINT-TO-POINT LINKS BETWEEN ENDPOINTS

FIELD OF THE INVENTION

The present disclosure generally relates to techniques for ransomware protection. More particularly, the present disclosure is related to providing lateral movement protection from Ransomware in environments, such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects computer systems and encrypts files. A ransom is demanded in exchange for a decryption key.

Conventional enterprise security solutions have proven to be inadequate in view of the high-profile ransomware cases of large companies, such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN-based network architecture. If a device that is part of a shared VLAN broadcast domain is infected by ransomware or malware, there are very few security controls that can be implemented to prevent lateral propagation of the ransomware within the same VLAN network.

Referring to FIG. 1A, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1A.

Referring to FIG. 1B, when an endpoint device (e.g., endpoint 1) in a shared VLAN desires to communicate with another endpoint device in the same VLAN (e.g., endpoint 2) it will first send out a broadcast Address Resolution Protocol (ARP) request 101 to learn about the Layer 2 MAC address of the other endpoint device. If the network switch 140 has not learnt about the MAC address of the destination endpoint, it will forward the broadcast request 102 to all of the switch's ports. When the ARP request reaches the other endpoint (e.g., endpoint 2), it replies with a directed ARP response 103 containing its MAC address to the source endpoint. The network switch also learns about the destination MAC address and updates its Port < > MAC address table. An example port-mac address table is shown in FIG. 1C, In the example of FIG. 1C, the MAC address table displays the MAC addresses learned on VLAN 1. The table provides the following information for each entry. For the VLAN column, the VLAN number associated with the MAC address. For the Mac Address column, the MAC address of the endpoint device. For the Type column, the type of entry, which in this example is "DYNAMIC" for a dynamically learned entry. The Ports column is for the switch port on which the MAC addresses are learned. The address table helps the switch forward network traffic by associating MAC addresses with the corresponding switch ports.

Further communication between the two endpoints is now directly forwarded by the network switch from the source port to the destination port in ARP response 104. Thus, the network firewall is oblivious to this communication between the endpoints in the shared VLAN and cannot prevent malicious communication between the endpoints. However, this allows malware such as ransomware to propagate laterally and infect all endpoints in the shared VLAN segment.

Returning to the example of FIG. 1B, consider the example in which Endpoint 1 desires to communicate with Endpoint 2. To learn about the Layer 2 (MAC) address of Endpoint 2—it sends out a broadcast ARP request on the wire. The Network switch (not having learnt about Endpoint 2 yet) broadcasts this request on all available ports on this shared VLAN. One of the broadcast requests reaches Endpoint 2, and it replies to the ARP request with an ARP response containing its MAC address. Other endpoints such as Endpoint 3, which also receive this ARP request discard the message as its not destined to them. The network switch now learns about the MAC address of Endpoint 2 and forwards the ARP response to Endpoint 1. Subsequent communication between Endpoint 1 and Endpoint 2 is now directly forwarded by the switch to the appropriate ports. Hence the Firewall deployed northbound to the switch has no opportunity to inspect the communication between Endpoints 1 and 2 and cannot allow/deny the traffic.

This direct communication between endpoints in the shared VLAN allows malware and ransomware to propagate laterally and potentially compromise multiple devices in the shared VLAN.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software applications on endpoint devices provide only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

In one implementation, a security appliance is set as the default gateway for intra-LAN communication for two or more endpoint devices. A network switch is configured to drop ARP response packets from all but the port the security appliance is attached to. The security appliance is a default gateway for a plurality of endpoint devices of the shared VLAN environment. In one implementation, the security appliance is used to detect ransomware.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

FIG. 1C illustrates an ARP address resolution table.

DETAILED DESCRIPTION

Figure 1A:
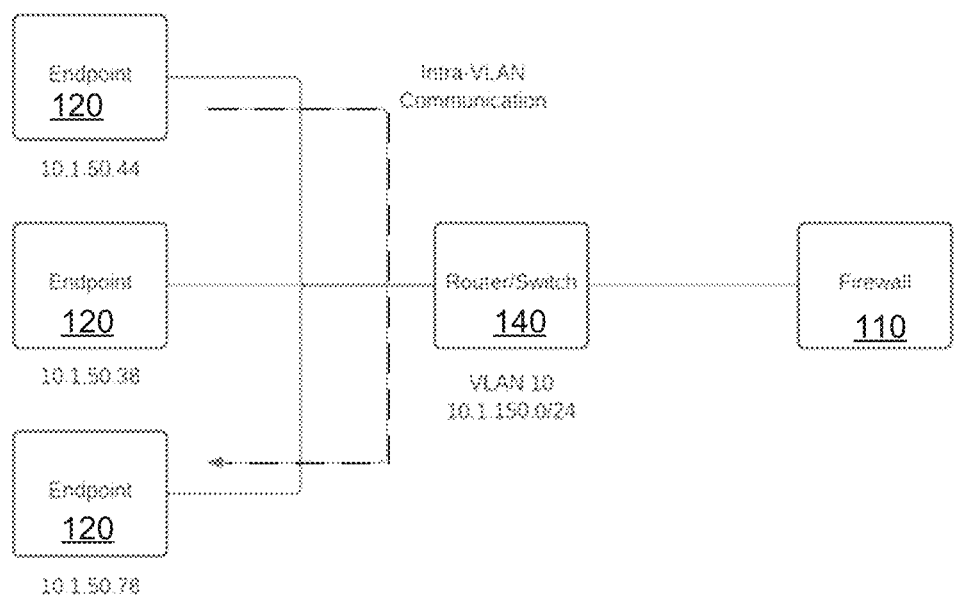
FIG. 1A is a block diagram illustrating Intra-LAN traffic in a conventional VLAN network.
Figure 1B:
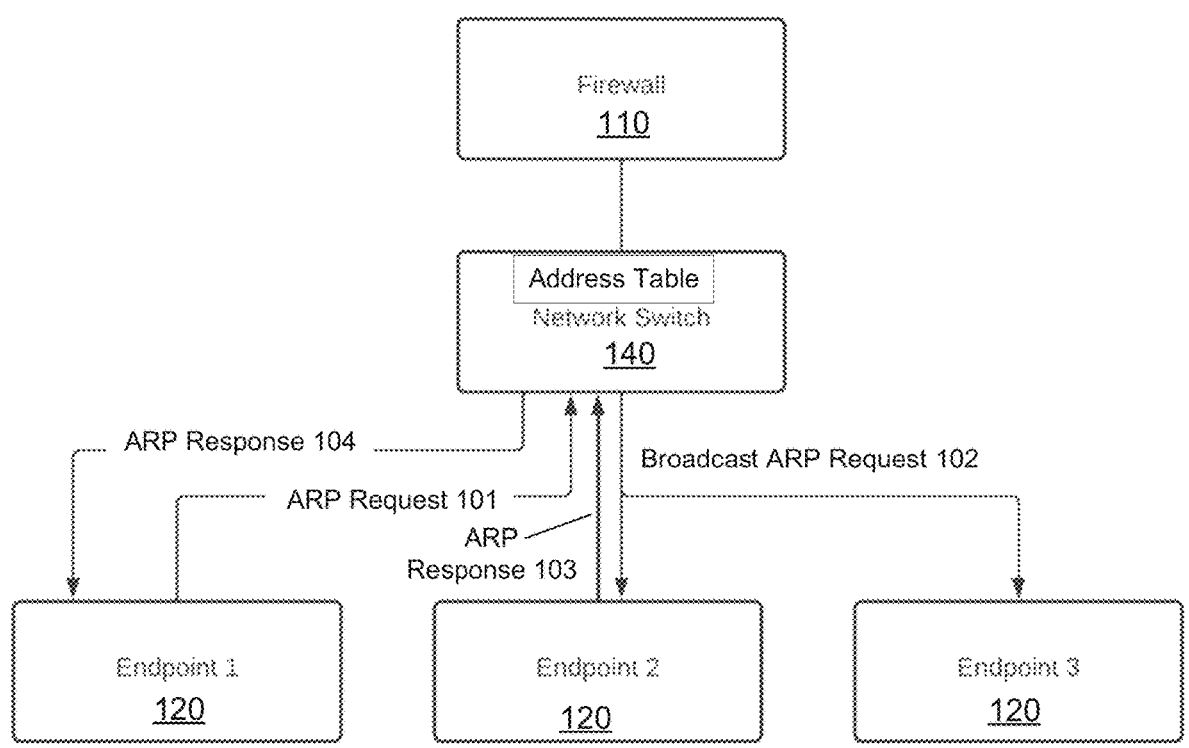
FIG. 1B illustrates ARP messages in in a conventional VLAN network.
Figure 2:
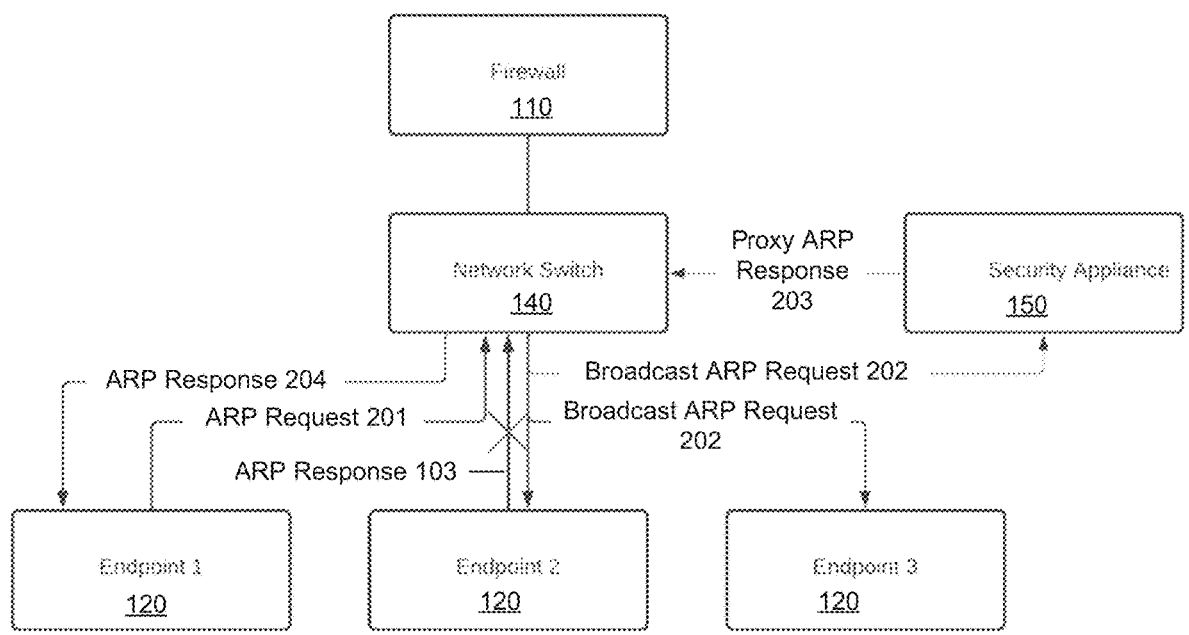
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device, such as the router/switch. As an illustrative example, the security appliance 150 may be implemented as software compatible with a virtual machine (VM) implementation, such as within a hypervisor implementation in VMware®. The security appliance may be deployed on a port of a network switch 140 that allows the security appliance to monitor and control the flow of message traffic across a network node for a plurality of endpoint devices with an individual VLAN domain or even across multiple VLAN domains.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

One aspect of the approach illustrated in FIG. 2 is that a network operator configures the network switch 140 to drop ARP responses from any switch port other than the port to which the security appliance 150 is connected to. As an example, consider a sample configuration for a network switch to configure ARP control for a Cisco® switch. Access to a configuration mode of the Cisco® network switch uses the following commands:
1) enable
2) Configure Terminal The port connected to the security appliance 150 is configured to use sticky secure MAC addresses. For example, assuming a decision is made to configure port 1 for use by the security appliance 150, the following commands are used:
interface FastEthernet 0/1
switchport mode access
switchport port-security
switchport port-security maximum 1
switchport port-security mac-address sticky The configuration changes are then saved by issuing the following command: write memory.

With the above configuration, the switch will learn the MAC address connected to the specified port and restrict ARP responses to that MAC address only. If another device tries to send an ARP response on a different port, it will be blocked.

The above example is for illustration. Other network switches may utilize somewhat different configuration details to achieve a similar end result.

The security appliance 150 responds to an ARP request from any of the endpoints with its own MAC address. Further communication between endpoints in the shared VLAN will always be forwarded by the security appliance 150 acting as a gateway. This has the effect of establishing virtual point to point links between the security appliance 150 and each endpoint which is part of the shared VLAN domain and forcing all traffic from an endpoint to traverse the security appliance 150.

FIG. 2 shows the packet flow when one endpoint device tries to communicate with another endpoint device in the shared VLAN or network segment. The steps involved in the message flow above are described here after the Airgap security appliance 150 is deployed on the network switch 140 and ARP control is configured. Consider the situation where Endpoint device 1 desires to communicate with Endpoint device 2. To learn about the Layer 2 (MAC) address of Endpoint device 2, Endpoint device 1 sends out a broadcast ARP request 201 on the wire.

The network switch 140 (not having learnt about Endpoint 2 yet) broadcasts this request on all available ports on this shared VLAN in a broadcast ARP request 202.

One of the broadcast requests reaches Endpoint 2, and it replies to the ARP request with an ARP response 203 containing its MAC address. Other endpoints such as Endpoint 3, which also receive this ARP request discard the message as it's not destined to them. The security appliance 150 also receives the same broadcast ARP request and responds to this with an ARP response containing its own MAC address (also known as a Proxy ARP response 203).

The network switch 140 is configured using ARP control policies to discard ARP responses from all ports, other than the port connected to the security appliance 150. Hence the network switch 140 will discard ARP responses from all other ports (such as ARP response 203 from Endpoint 2), other than the port connected to the security appliance 150. Endpoint 1 upon receiving the proxy ARP response 204 from the security appliance 150 will use that MAC address to communicate with Endpoint 2.

Subsequent communication between Endpoint 1 and Endpoint 2 is now forwarded first to the security appliance which then inspects the packet to see if it is an authorized communication and subsequently forwards it to Endpoint 2. In this way all lateral communication between endpoints in the same VLAN are first inspected by the security appliance 150 and allowed/denied based on the configured security policies.

The system and method illustrated in FIG. 2 may be used for preventing lateral propagation of ransomware.

The Zero Trust Isolation solution is also able to detect attempts to circumvent the protection provided by the security appliance. If a compromised endpoint attempts to bypass the gateway and tries to laterally propagate to another device, this attempt would be detected by the security appliance and appropriate action would be taken.

This detection is because the uncompromised endpoint would still send the response packets to the compromised endpoint via the security appliance (due to the proxy ARP behavior outlined above). The security appliance detects the fact that it has seen a response packet to a request sent by the compromised endpoint, and it alerts the operator in this case. Automatic actions may be taken by the security appliance 150 including quarantining the compromised endpoint so that further lateral propagation is impossible.

The Zero Trust Isolation solution introduces several new innovations to the way enterprise networks are configured and managed. Some of these include:
1) Configuring ARP control on the network security switch to force all lateral network traffic via the security appliance 150.
2) Allow only authorized communication between endpoints, thereby significantly reducing the attack surface and lateral propagation by malware and ransomware.

Figure 3:
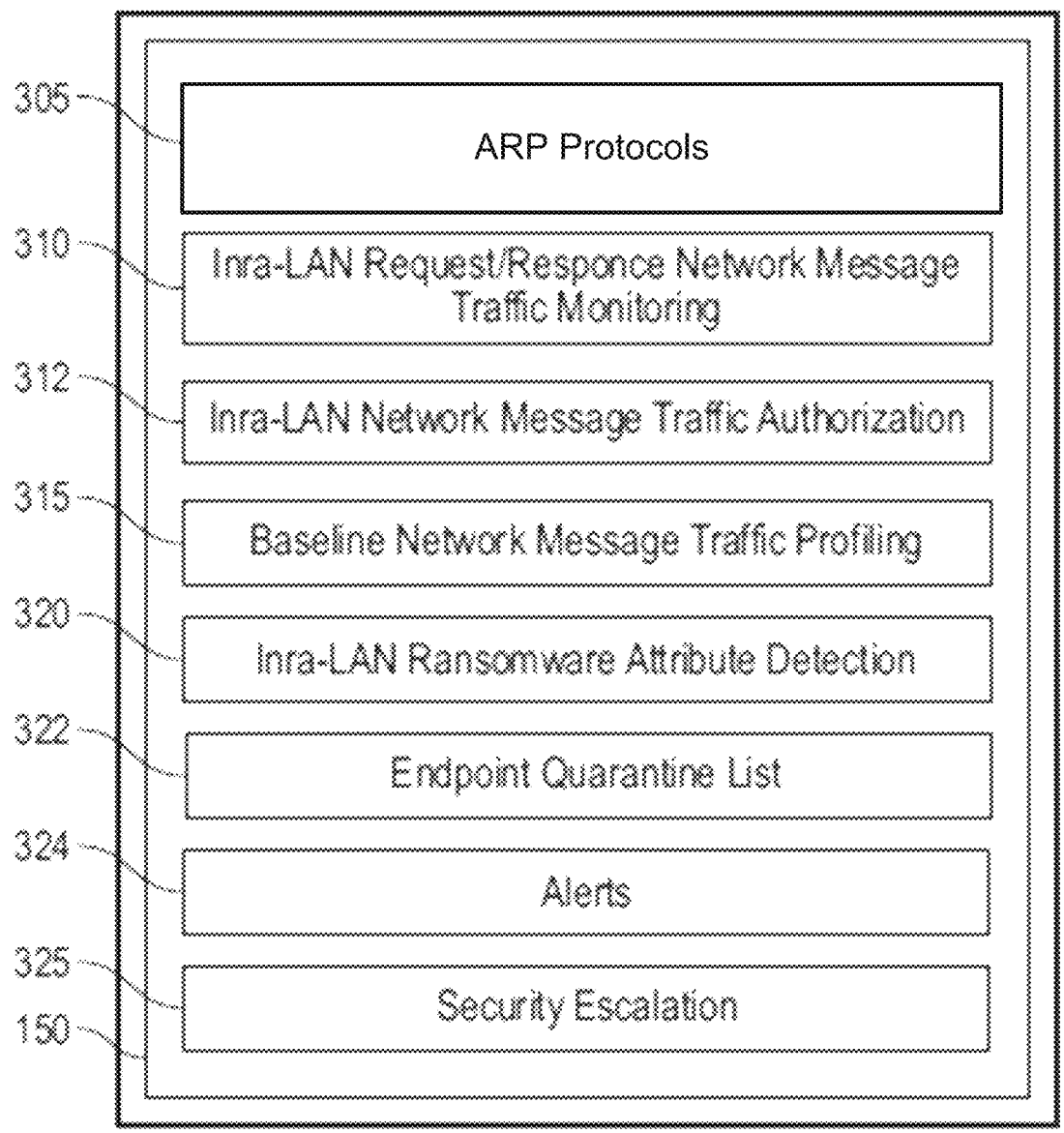
FIG. 3 is a block diagram illustrating components of a security appliance in accordance with an implementation.
Figure 4:
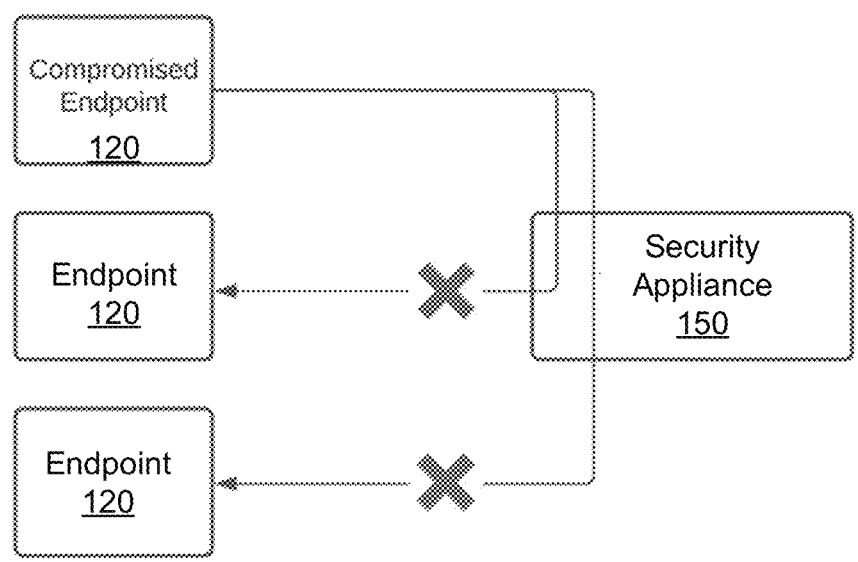
FIG. 4 illustrates the security appliance set as the default gateway in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may be implemented as software stored on a computer memory and executable by a processor associated with an access port or a trunk port. In the example of FIG. 3, the security appliance 150 sets the security appliance as a default gateway as described above. An ARP protocol module 305 may be implemented for the security appliance to respond as described above. An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransomware). An alerts unit 324 may be included to generate automated alerts, such as generating alerts for an administrator of an attempted ransomware attack. An optional security escalation unit 325 may be included to implement a security escalation protocol to increase security.

Figure 5:
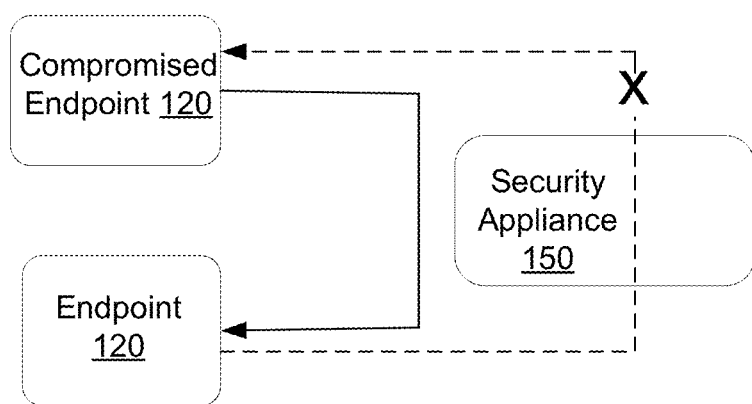
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

FIG. 5 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 6:
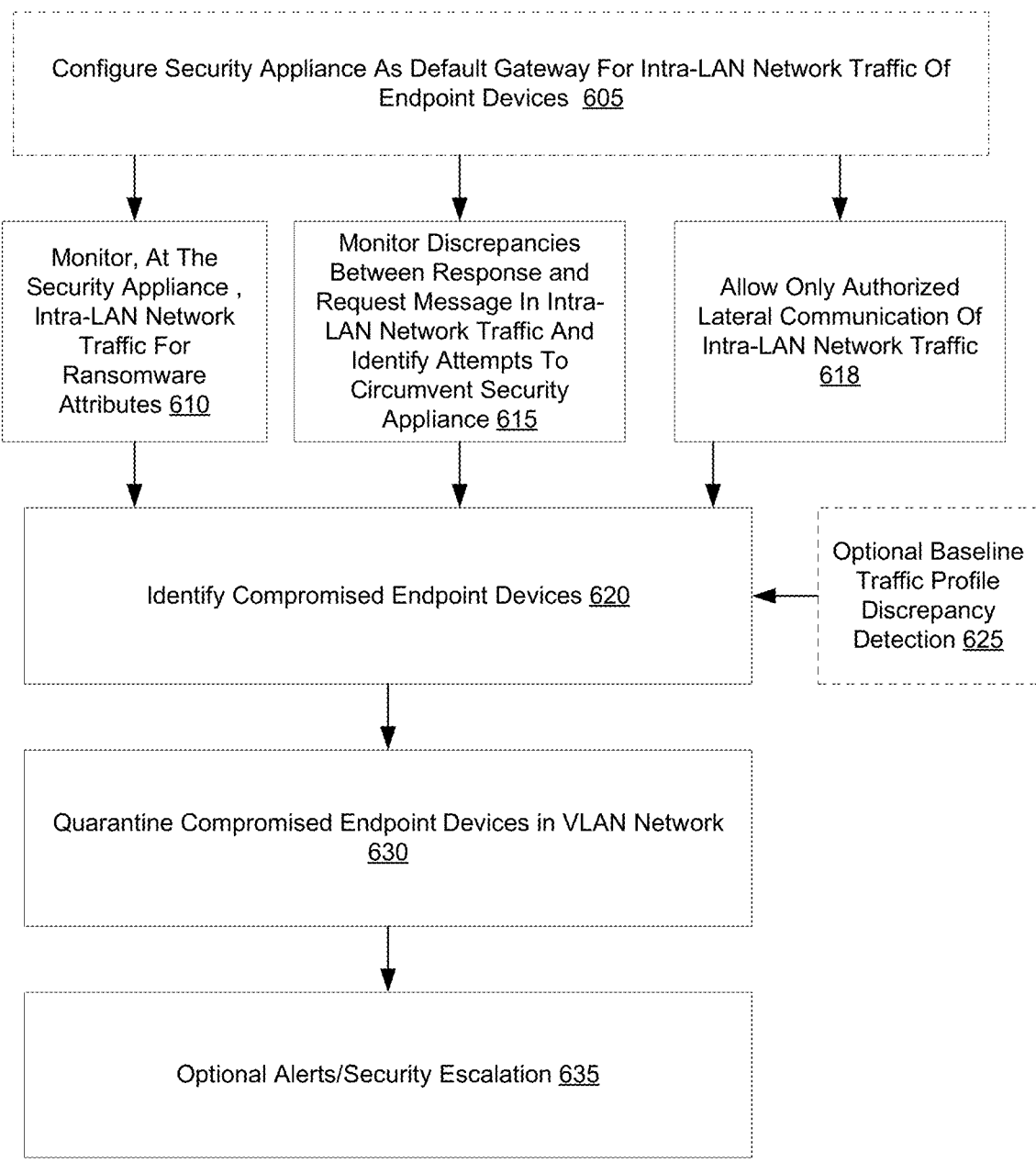
FIG. 6 illustrates how the security appliance may detect compromised endpoints attempting to circumvent the security appliance in accordance with an implementation.

FIG. 6 is a flow diagram of a method in accordance with an implementation. In block 605, a security appliance is configured as the default gateway for Intra-LAN network traffic of endpoint device. In block 610, the security appliance monitors intra-LAN network traffic for ransomware attributes. In block 615, the security appliance also monitors the intra-LAN message traffic for discrepancies between response and request messages in intra-LAN network traffic and identifies attempts to circumvent the security appliance. In block 618, the method also includes the security appliance allowing only authorized lateral communication of Intra-LAN network traffic. In block 620, compromised endpoint devices are identified based on the outputs of blocks 610 and 615. Optionally, discrepancies with respect to a baseline message traffic profile from block 625 may be considered as an additional factor. In block 630, compromised endpoint devices are quarantined. This may include, for example, placing them on a list of quarantined devices, blocking communication with them, or taking other measures to isolate them. In block 635, optional alerts or security escalation may be performed. Security escalation could, for example, include implementing a security protocol to take further action to mitigate or minimize the risk of further damage from a ransomware attack.

Alternate Implementations

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions, and/or formats. Furthermore, the modules, routines, features, attributes, methodologies, and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:
    configuring Address Resolution Protocol (ARP) control on a network switch to force all lateral network traffic between a plurality of endpoint devices of a shared Virtual Local Area Network (VLAN) to traverse a security appliance coupled to a port of the network switch;
    monitoring, by the security appliance, intra-VLAN message traffic communication between the plurality of endpoint devices of the shared VLAN; and
    detecting, by the security appliance, lateral propagation of ransomware between endpoint devices.

2. The computer-implemented method of claim 1, wherein configuring ARP control on a network switch, comprises configuring the network switch to drop Address Resolution Response packets received from all ports of the network switch except for a port through which the security appliance is connected to.

3. The computer-implemented method of claim 2, wherein the port the security appliance is connected to is configured to use sticky secure Medium Access Control (MAC) addresses.

4. The computer-implemented method of claim 3, wherein the security appliance responds to ARP requests from any of the plurality of endpoint devices with the secure Medium Access Control (MAC) address of the security appliance.

5. The computer-implemented method of claim 1, wherein the method comprises a configuration process that includes:
    a first endpoint device, coupled to the network switch by a first port, sending an ARP request to learn a layer 2 secure Medium Access Control (MAC) address a second endpoint device;
    the network switch broadcasting the ARP request on all available ports of the shared VLAN;
    the second endpoint device, coupled to the network switch by a second port, replying to the ARP request by broadcasting its MAC address;
    the security appliance, coupled to the network switch by a third port, responding to the ARP request with a proxy ARP response including a MAC address of the security appliance; and
    the network switch discarding ARP responses from all ports except for the third port;
    wherein subsequent communication between the first endpoint device and the second endpoint device is forwarded through the security appliance.

6. The computer-implemented method of claim 1, wherein the security appliance blocks unauthorized communication between the plurality of endpoint devices of the shared VLAN.

7. The computer-implemented method of claim 1, further comprising: quarantining an endpoint device compromised by ransomware.

8. The computer-implemented method of claim 7, wherein the quarantining comprises blocking intra-VLAN communication of the compromised endpoint device.

9. The computer-implemented method of claim 1, where the detecting comprises detecting an attribute of a message indicative of ransomware.

10. The computer-implemented method of claim 9, wherein the message attribute comprises file scanning code or file encryption code.

11. The computer-implemented method of claim 1, wherein the detecting comprises detecting an attribute of message traffic, relative to a baseline profile of message traffic, indicative of ransomware.

12. A system for ransomware protection in a Virtual Local Area Network (VLAN), comprising:
    a processor and a memory storing computer program instructions, which when executed on the processor implements a method, including:
        configuring Address Resolution Protocol (ARP) control on a network switch to force all lateral network traffic between a plurality of endpoint devices of a shared Virtual Local Area Network (VLAN) to traverse a security appliance coupled to a port of the network switch;
        monitoring, by the security appliance, intra-VLAN message traffic communication between the plurality of endpoint devices of the shared VLAN; and
        detecting, by the security appliance, lateral propagation of ransomware between endpoint devices.

13. The system of claim 12, wherein configuring ARP control on a network switch, comprises configuring the network switch to drop Address Resolution Response packets received from all ports of the network switch except for a port through which the security appliance is connected to.

14. The system of claim 13, wherein the port of the security appliance is connected to is configured to use sticky secure Medium Access Control (MAC) addresses.

15. The system of claim 14, wherein the security appliance responds to ARP requests from any of the plurality of endpoint de vices with the secure Medium Access Control (MAC) address of the security appliance.

16. The system of claim 12, wherein the method implemented by the computer program instructions comprises a configuration process that includes:
    a first endpoint device, coupled to the network switch by a first port, sending an ARP request to learn a layer 2 secure Medium Access Control (MAC) address a second endpoint device;
    the network switch broadcasting the ARP request on all available ports of the shared VLAN;
    the second endpoint device, coupled to the network switch by a second port, replying to the ARP request by broadcasting its MAC address;
    the security appliance, coupled to the network switch by a third port, responding to the ARP request with a proxy ARP response including a MAC address of the security appliance; and
    the network switch discarding ARP responses from all ports except for the third port;
    wherein subsequent communication between the first endpoint device and the second endpoint device is forwarded through the security appliance.

17. The system of claim 12, wherein the security appliance blocks unauthorized communication between the plurality of endpoint devices of the shared VLAN.

18. The system of claim 12, wherein the method implemented by the computer program instructions further includes: quarantining an endpoint device compromised by ransomware.

19. The system of claim 18, wherein the quarantining comprises blocking intra-VLAN communication of the compromised endpoint device.

20. The system of claim 12, where the detecting comprises detecting an attribute of a message indicative of ransomware.

21. The system of claim 20, wherein the message attribute comprises file scanning code or file encryption code.

22. The system of claim 12, wherein the detection comprises detecting an attribute of message traffic, relative to a baseline profile of message traffic, indicative of ransomware.

* * * * *